United States Patent
Hwang et al.

(10) Patent No.: US 7,940,637 B2
(45) Date of Patent: May 10, 2011

(54) OPTICAL RECORDING MEDIUM HAVING SUPER-RESOLUTION STRUCTURE FOR IMPROVEMENT OF REPRODUCING STABILITY AND NOISE CHARACTERISTIC IN LOW FREQUENCY BAND

(75) Inventors: Wook Yeon Hwang, Gyeonggi-do (KR); Jooho Kim, Gyeonggi-do (KR); Jung-Hyeon Kim, Gyeonggi-do (KR); Taek Sung Lee, Seoul (KR); Byung Ki Cheong, Seoul (KR); Hyun Seok Lee, Seoul (KR); Suyoun Lee, Gyeonggi-do (KR); Won Mok Kim, Seoul (KR); Jeung-hyun Jeong, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 371 days.

(21) Appl. No.: 12/260,509

(22) Filed: Oct. 29, 2008

(65) Prior Publication Data
US 2009/0245079 A1    Oct. 1, 2009

(30) Foreign Application Priority Data

Mar. 26, 2008  (KR) ........................ 10-2008-0027741

(51) Int. Cl.
*G11B 7/24* (2006.01)

(52) U.S. Cl. ............... 369/275.4; 369/288; 369/283
(58) Field of Classification Search .............. 369/275.3, 369/275.4, 288, 286, 284, 283, 47.5, 47.51, 369/53.26; 428/64.4
See application file for complete search history.

(56) References Cited

U.S. PATENT DOCUMENTS 7,542,404 B2 *  6/2009  Yusu et al. ................. 369/275.1
7,701,838 B2 *  4/2010  Kikukawa et al. ............ 369/284

FOREIGN PATENT DOCUMENTS

| JP | 08-287515 | 11/1996 |
| KR | 1997-4614 | 3/1997 |
| KR | 2005-94279 | 9/2005 |

* cited by examiner

*Primary Examiner* — Ali Neyzari
(74) *Attorney, Agent, or Firm* — Bacon & Thomas, PLLC

(57) ABSTRACT

A super-resolution optical recording medium includes a reflective layer formed on a substrate, a recording layer for recording information thereon, a super-resolution layer made of a chalcogenide semiconductor material, and a first and a second dielectric layers laminated on upper and lower surfaces of the super-resolution layer. The recording layer is made of a material that has a decomposition temperature higher than an information reproduction temperature and does not form bubble recording marks during recording, and the super-resolution layer contains one or more elements selected from the group consisting of nitrogen, oxygen, carbon, and boron.

10 Claims, 6 Drawing Sheets

OPTICAL RECORDING MEDIUM HAVING SUPER-RESOLUTION STRUCTURE FOR IMPROVEMENT OF REPRODUCING STABILITY AND NOISE CHARACTERISTIC IN LOW FREQUENCY BAND

FIELD OF THE INVENTION

The present invention relates to an optical recording medium having a super-resolution structure, which can prevent deterioration of a recording state at high-temperature and also suppress noise that occurs when a signal is reproduced at high temperature

BACKGROUND OF THE INVENTION

To store a signal flow of currently available high-definition digital video, a data storage medium should have a capacity of 20 GB or more and be able to record at a data transfer rate of 25 Mbps or faster. Several types of versatile information storage techniques in diverse multimedia environments have been developed.

Among many information storage techniques, an optical recording technique drew interest because it is removable, stores large capacity of information, supports a random access (that is essential in the multimedia environment), provides high reliability of data, and is cost-effective.

A currently available phase-change optical recording medium has storage capacity of either a red laser DVD (4.7 GB) or a blu-ray disc (BD) (25 GB) emerged recently on the market. However, in order to record, store, and reproduce an enormous amount of information such as HD-TV or E-medicine, an ultra-high density information storage technique has been required.

The storage capacity of an optical recording medium is largely dependent upon the characteristics of an incident laser light focused by a focusing lens. Because of this, the smaller the focused laser light spot size is, the higher the information density is. When the laser light is focused by an objective lens having a given numerical aperture (NA), the spot size at a diffraction limit is proportional to the wavelength ($\lambda$) of the laser light, and inversely proportional to the NA of the objective lens. Therefore, to improve the recording capacity of an optical recording medium, the wavelength ($\lambda$) of an incident laser light should be decreased or the NA of an objective lens should be increased.

Further growth of recording capacity, however, reaches a substantial limit when the NA of the objective lens is 1, which is the theoretical maximum numerical aperture, and use is made of visible light with the shortest wavelength near a UV region where optical properties of storage medium elements undergo considerable changes.

Recently, many researches are actively involved in an optical recording medium having a super-resolution structure (hereinafter, referred to as a super-resolution optical recording medium) as a scheme of optical recording media that is able to store several hundreds times higher density information than the early CD storage capacity (e.g., 650 MB), while being compatible with existing CD and DVD players in terms of laser and lens specification.

The super-resolution technique makes it possible to record and reproduce high linear density and high track density information of a spatial period below $\lambda/2NA$ by reducing the effective size of a focused light reaching an information storage layer to the size of a diffraction limit or smaller. This is achieved by using the properties that incident focused lights upon an optical recording medium contribute to local physical changes in super-resolution materials constituting the medium and to changes in optical characteristics of the materials depending on the light intensities thereof. One outstanding advantage of such technique is that it can realize ultra-high density beyond the diffraction limit, while adopting the existing optical recording medium system with guaranteed removability between the medium and a drive.

Hereinafter, the structure of a conventional super-resolution optical recording medium will be described with reference to the accompanying drawings.

FIG. 1 shows a conventional super-resolution optical recording medium having a reflective layer. Referring to FIG. 1, the conventional super-resolution optical recording medium has a laminated structure including a reflective layer 102 made of a metal alloy, a first dielectric layer 104, a super-resolution layer 106 exhibiting super-resolution properties, a second dielectric layer 108, a recording layer 110 made of an platinum oxide ($PtO_x$), a third dielectric layer 112, and a UV protection layer 114, sequentially formed on a substrate 100 made of polycarbonate, amorphous polyolefin (APO), glass or the like. All of the dielectric layers are made of the same material, $ZnS$—$SiO_2$.

As the $PtO_x$ layer 110 that is the recording layer and the super-resolution layer 106 undergo changes in thermal and optical properties due to a laser light, a super-resolution phenomenon occurs in the optical recording medium. In result, recording marks with a small size beyond a resolution limit recorded on the recording layer can be reproduced.

The recording marks are in the form of micro bubbles (hereinafter, referred to as bubble recording marks) having gas produced from the decomposition of the $PtO_x$ layer 110. That is, they are formed by decomposition of a part of the $PtO_x$ layer 110 with an incident laser power. The size of such a bubble recording mark and the distance between bubble recording marks influence the density of information being recorded.

Meanwhile, the super-resolution layer 106 is made of chalcogenide semiconductor materials such as Pb—Te, Ge—Sb—Te, and Ag—In—Sb—Te. Although there is no definite theory on the super-resolution mechanism of these materials, it is known that irradiation and the subsequent heating by an incident laser light for information recording/reproducing bring a change in optical transmittance (a ratio of intensity of incident light to that of transmitted light) of the super-resolution layer 106, showing super-resolution characteristics. For instance, when the incident laser light heats the super-resolution layer 106 in a crystalline solid state, optical transmittance increases gradually with laser power in a region where the temperature of the super-resolution layer 106 reached a threshold or higher, showing thermo-optical non-linear effects (Type I). Further, optical transmittance increases discontinuously in a region where the temperature of the super-resolution layer 106 reached a melting temperature or higher, due to changes in optical constants caused by a solid-to-liquid phase transition of a part of the crystalline solid super-resolution layer 106 (Type II).

More specifically, in case of Type I, when the focused laser light, having a Gaussian intensity profile, is irradiated onto the super-resolution layer, a corresponding Gaussian-like temperature profile is formed from light absorption. Accordingly, thermally-assisted photo-excitation may take place, producing saturable absorption by band filling in the manner of varying degree continuously along the profile. This results in the corresponding increase in optical transmittance, viz. largest at the center and gradually diminishing outward, thereby reducing a full width half maximum (FWHM) of the intensity profile of transmitted light which propagated through the super-resolution layer.

In case of Type II, the solid-to-liquid phase transition occurs at the central portion of the super-resolution layer by irradiation of a focused laser beam. Also, since transmittance of the super-resolution layer is higher in the liquid state than in the solid state, the FWHM of the intensity profile of transmitted light which penetrated through the super-resolution layer is reduced according to size of the liquid portion.

To record and reproduce information repeatedly on and from the super-resolution recording medium having the recording layer made of $PtO_x$ and the super-resolution layer showing the behavior of Type I or Type II set forth above, it is inevitable for the recording medium to be heated repeatedly by the laser light. However, this repetitive heating accounts for the property degradation of the super-resolution optical recoding medium as each layer of the medium is influenced thermally.

In particular, when the $PtO_x$ layer functioning as the recording layer is heated for information recording by an incident laser light, gas of the bubble recording marks formed for information recording is likely to diffuse into the upper and lower layers of the recording layer, causing the bubble recording marks to change size and shape thereof. This can be inferred from the fact that the decomposition temperature of $PtO_x$ (i.e. temperature where bubble recording marks are produced) ranges from about 500° C. to 550° C. which is very similar to the temperature range for information reproduction by laser light. It is also predicted that the property variations of bubble recording marks by such gas diffusion will become gradually worse as the $PtO_x$ layer functioning as the recording layer is heated repeatedly, that is, as the number of information reproduction increases. In result, the property variations of the bubble recording marks formed in the $PtO_x$ layer give rise to distortions in reproduced signals during reproduction.

Regardless of whether super-resolution layer materials correspond to Type I or Type II, they all absorb incident laser lights for realization of the super-resolution function and experience a temperature rise in doing so. Since the super-resolution layer cannot avoid repetitive heating accompanying the repetitive data recording or data reproduction, it is evident that such repetitive heating may change properties of the super-solution layer as the number of recording or reproduction operations increases.

Meanwhile, heating by laser light may cause interdiffusion between layers in the conventional super-resolution optical recording medium. For example, interdiffusion may occur between the super-resolution layer and its neighboring dielectric layers made of $ZnS$—$SiO_2$, or between the substrate and the reflective film. Besides, the interdiffusion is accelerated especially when a layer contains sulfur with a high diffusion rate as in $ZnS$—$SiO_2$, so it can be another cause of the property degradation of the super-resolution layer.

FIGS. 2A and 2B show, respectively, a graph of RF signal at the time of an initial reproduction operation and a graph of RF signal after the repetitive reproduction operations for 1,000 times in a conventional super-resolution optical recording medium in which a recording layer was made of a platinum oxide, a super resolution layer was made of Ge—Sb—Te, and first and second insulation layers were made of $ZnS$—$SiO_2$.

FIG. 2B is an enlarged view of part of FIG. 2A, wherein x-axis represents time and y-axis represents voltage of a reproduced signal. Referring to FIGS. 2A and 2B, it can be seen that waveform units of signals that are initially reproduced from the conventional super-resolution optical recording medium can be distinguished from one another, but the waveform units of signals after 1,000 times reproduction contain severe noise components and can not be distinguished from one another. In addition, the average voltage level and 2T amplitude were about 1.6 V and 50 mV, respectively, at the initial reproduction, but they were reduced to 1.4 V and 10 mV after 1,000 times reproduction, showing an about 12.5% decrease for the average voltage level and an about 80% decrease for the 2T amplitude.

Moreover, in the optical recording medium with a conventional super-resolution structure, up to 20 dB of noise or greater occurs at a frequency band of 10 MHz or lower. Such a low frequency noise deforms a reproduced signal, degrading signal characteristics of the optical recording medium.

Consequently, to resolve the property degradation of the conventional super-resolution optical recording medium caused by an increase in the number of reproduction operations, it is necessary for the optical recording medium to have a suitable endurance against the repetitive heating and the recorded information should be reproduced at a high signal-to-noise ratio even at a lower laser power.

SUMMARY OF THE INVENTION

It is, therefore, an object of the present invention to provide a super-resolution optical recording medium which is free from the gradual degradation by the increased number of reproduction operations and from which information can be reproduced at a high signal-to-noise ratio even at a lower laser power.

In accordance with the present invention, there is provided a super-resolution optical recording medium includes a reflective layer formed on a substrate, a recording layer for recording information thereon, a super-resolution layer made of a chalcogenide semiconductor material, and a first and a second dielectric layers laminated on upper and lower surfaces of the super resolution layer.

The recording layer is made of a material that has a decomposition temperature higher than an information reproduction temperature and does not form bubble recording marks during recording, and the super-resolution layer contains one or more elements selected from the group consisting of nitrogen, oxygen, carbon, and boron.

BRIEF DESCRIPTION OF THE DRAWINGS

The above and other objects and features of the present invention will become apparent from the following description of preferred embodiments, given in conjunction with the accompanying drawings, in which.

DETAILED DESCRIPTION OF THE PREFERRED EMBODIMENT

Figure 1:
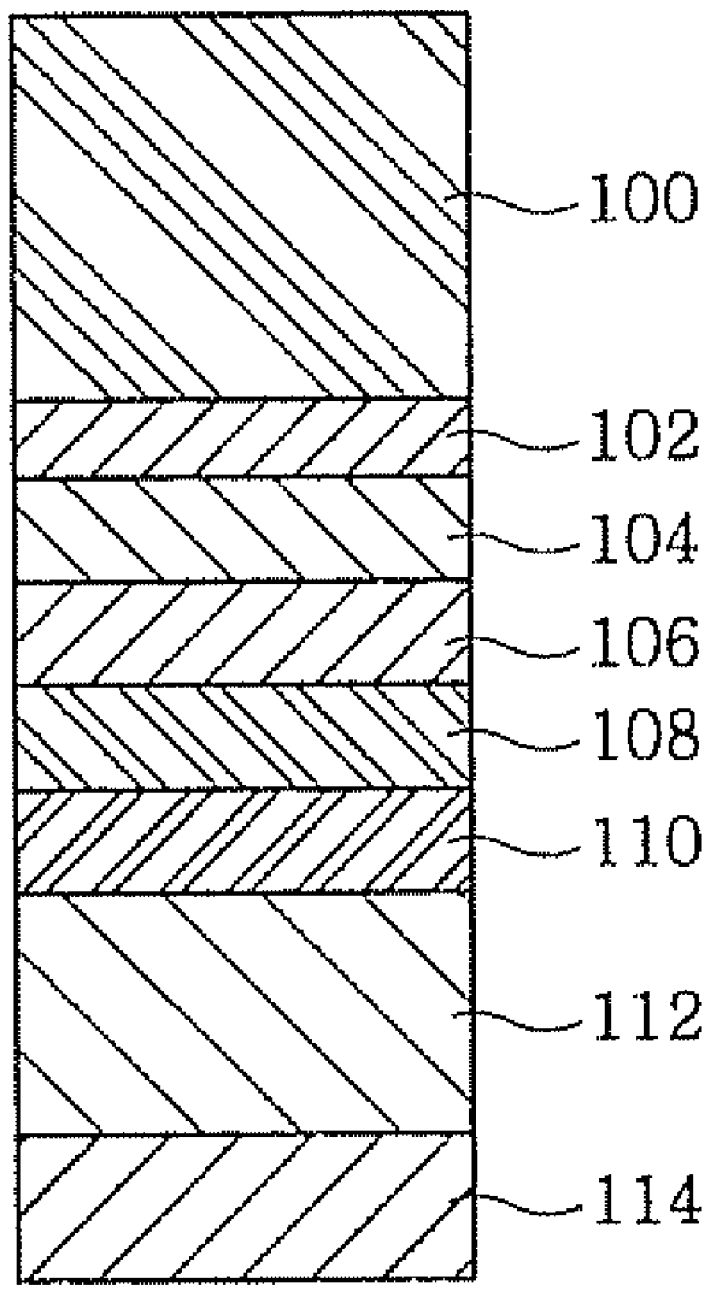
FIG. 1 shows a conventional super-resolution optical recording medium.
Figure 2A:
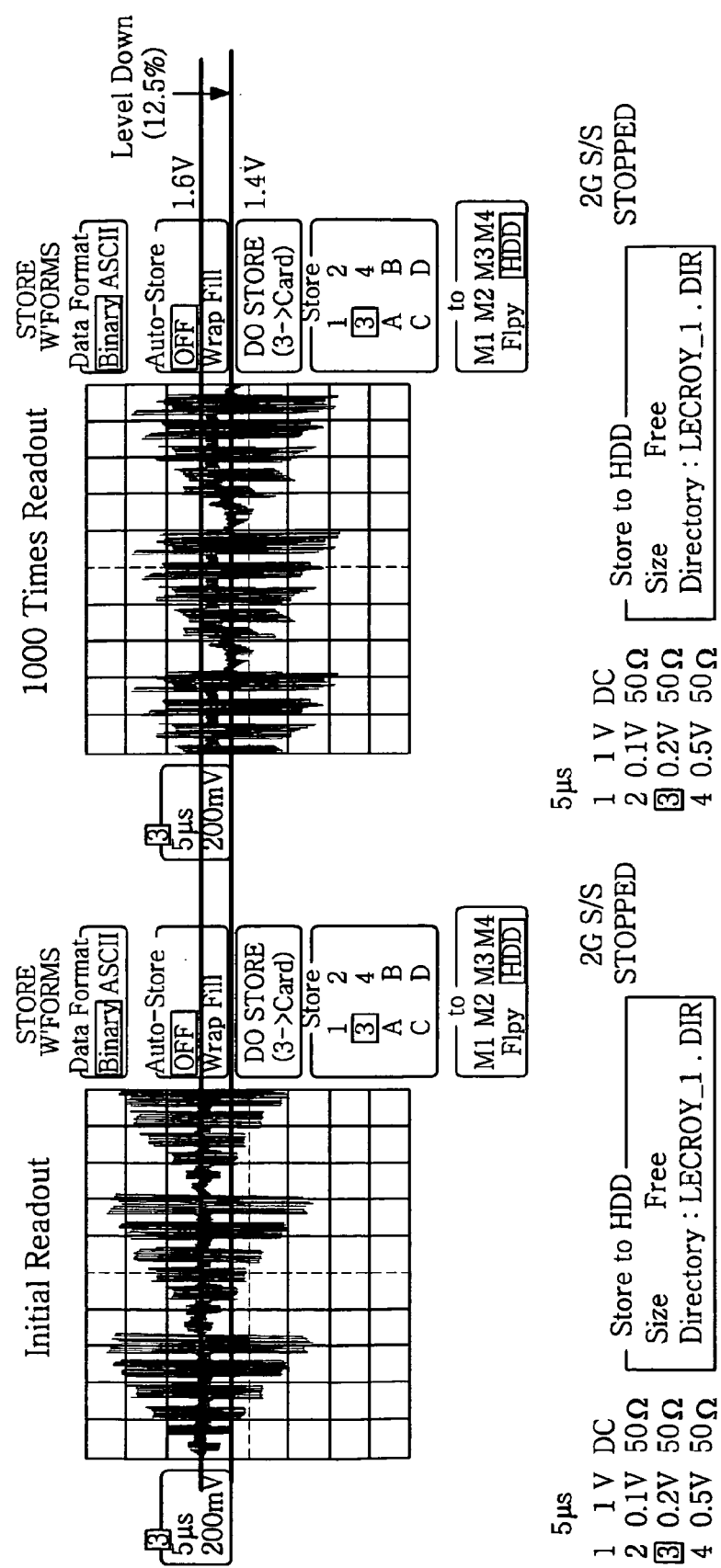
FIGS. 2A and 2B show, respectively, RF signal at the initial reproduction and RF signal after 1,000 times reproduction from the conventional super-resolution optical medium.
Figure 2B:
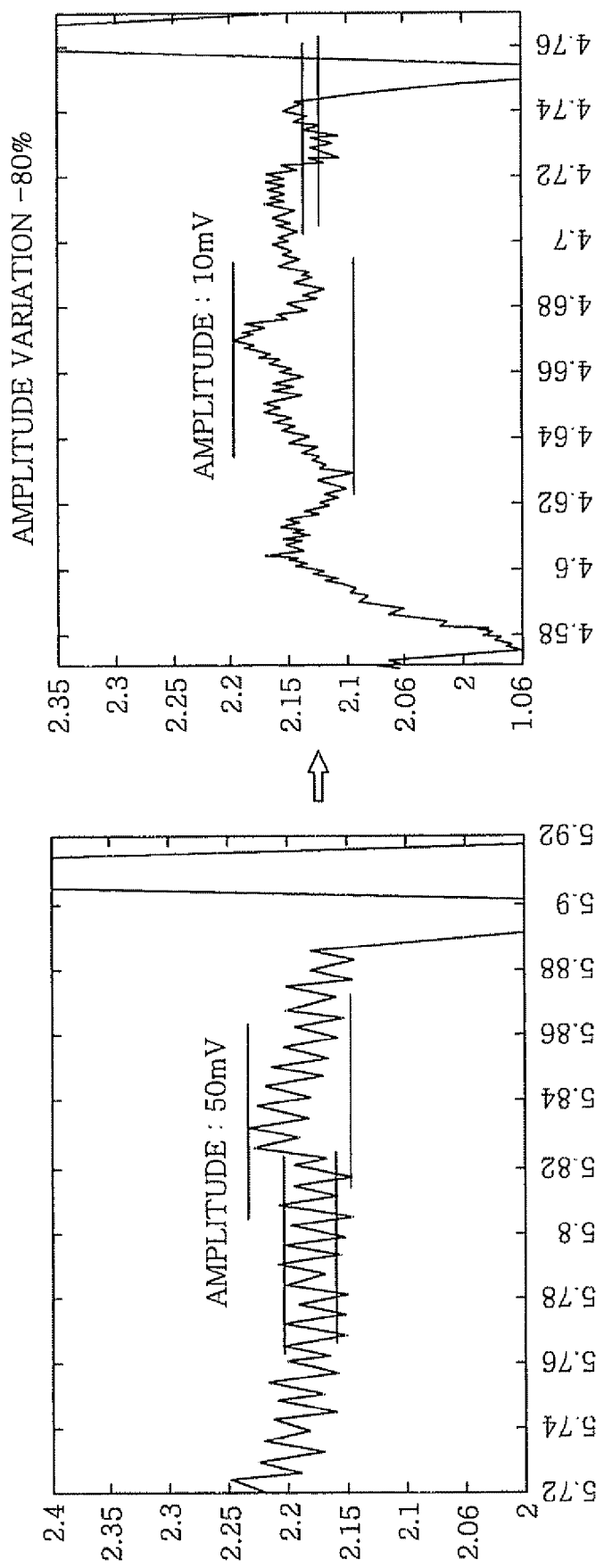

Hereinafter, preferred embodiments in accordance with the present invention will be described in detail with reference to the accompanying drawings. In the following description, well-known elements and functions will not be described in detail if they could obscure the invention in unnecessary detail.

A super-resolution optical recording medium in accordance with the present invention may use $BaTiO_3$ as an example of material that does not form bubble recording marks for a recording layer and its decomposition (or melting) temperature is considerably higher than the information reproductions temperature. Specifically, the decomposition temperature of $BaTiO_2$ is 1625° C., which is higher than the information reproduction temperature between 500 and 600° C., by approximately 1,000° C. Moreover, unlike $PtO_x$ compounds, $BaTiO_3$ does not form bubble recording marks. These features make it possible to fundamentally solve the problem of $PtO_x$, that is, gradual variations in bubble recording marks due to the diffusion of gas forming the bubble recording marks during the repetitive reproduction Unlike the conventional recording layer made of $PtO_x$, the recording layer of the present invention does not experience any change in its physical properties even if the number of reproduction operations increases, so recording state changes and signal degradation caused by the repetitive reproduction can be prevented. Here, $BaTiO_3$ used for the recording layer preferably has a thickness of 2 nm to 20 nm.

The super-resolution layer is made of a chalcogenide semiconductor material such as Pb—Te, Ge—Sb—Te, or Ag—In—Sb—Te, to which one or more elements selected from N, O, C, and B are added. The effects of added element(s) include the improvement of endurance against the repetitive reproduction of the super-resolution layer, and the reduction of laser reproduction power.

It is regarded that the improvement of endurance and the reduction of laser reproduction power are obtained because crystal grains of the super-resolution layer are reduced in size by the added elements. Those added elements may be solid-solutionized as individual atoms, or may exist in the form of compounds such as a nitride, an oxide, or a boride, within the super-resolution layer material. Either way, the elements contribute to the suppression of crystal grain growth against the increased number of reproduction operations, so that fine-grained microstructures of the super-resolution layer are maintained stably for endurance improvement. Moreover, the added elements themselves function as scattering sources to interfere with heat conduction, or refine the crystal grains of the super-resolution layer to increase the number of crystal grain boundaries which function as scattering sources against heat conduction. In case of lowering heat (thermal) conductivity of the super-resolution layer, it is expected that the following effects can be obtained depending on the type of the super-resolution layer.

That is, in the case of Type I, heat energy generated by light absorption is not easily transferred in the super-resolution layer, so the slope of a temperature profile increases. Therefore, the slope of an electron-hole concentration profile of the super-resolution layer and the slope of a light transmittance profile are increased. Accordingly, the laser light power to get the same spot size of a given transmitted light is reduced as the super-resolution layer has a lower heat conductivity.

On the other hand, in the case of Type II, when the heat conductivity of the super-resolution layer is low, a solid-to-liquid phase transition of the super-resolution layer occurs even with a relatively low laser power. Therefore, the reduction of laser power for information reproduction is achieved.

The reduction of laser power lowers thermal load on the super-resolution optical recording medium, thus contributing to the improvement of endurance of the medium against the repetitive information reproduction/recording. In addition, since noises of the medium increase proportionally to the power of an incident laser light used for reproduction, a carrier-to-noise ratio (CNR) increases consequently through the reduction of the reproduction laser power.

The super-resolution layer is formed by sputtering, and desired elements in gaseous form can be introduced into a sputtering chamber to thereby add the elements to the super-resolution layer. For example, when a super-resolution layer is formed by using a sputter target having the composition of $Ge_5Sb_{75}Te_{20}$, then, an inert gas, e.g., Ar, used for sputtering is mixed with a target gas containing elements to be added to the super-resolution layer to carry out sputtering. Nitrogen gas or oxygen gas is used to add nitrogen or oxygen to the super-resolution layer. Meanwhile, $CH_4/B_3H_6$ mixed gas is used to add carbon or boron to the super-resolution layer. Two or more mixed gas may be used to add two or more elements. Preferably, the super-resolution layer has a thickness ranging from 1 nm to $\lambda/2\pi k$ nm (where $\lambda$ denotes wavelength of a laser light used and k denotes extinction coefficient at room temperature).

A diffusion barrier layer made of GeN, SiN or $SiO_2$ is formed between the super-resolution layer and its neighboring dielectric layer made of $ZnS$—$SiO_2$ to prevent interdiffusion between them The diffusion barrier layer is preferably 2 nm to 10 nm in thickness. This diffusion barrier layer effectively blocks interdiffusion, particularly the diffusion of sulfur, between the super resolution layer and its neighboring dielectric layer during a high-temperature reproduction, so reproduction degradation caused by the increased number of reproduction operations can be prevented.

Further, a substrate protective layer can be formed between the reflective layer and the substrate to prevent degradation in the substrate due to the high-temperature information reproduction. Here, the substrate is made out of a material selected from the group consisting of polycarbonate (PC), polymethyl methacrylate (PMMA), amorphous polyolefin (APO), and glass. In particular, the substrate protective layer prevents degradation in the substrate after its reaction with the reflective layer made of a metal, for example, AgPdCu, during the high-temperature information reproduction/recording. Examples of a material for the substrate protective layer include, but are not limited toy $ZnS$—$SiO_2$, GeN, SiN and $SiO_2$, and a thickness thereof preferably ranges from 10 nm to 20 nm.

Figure 3:
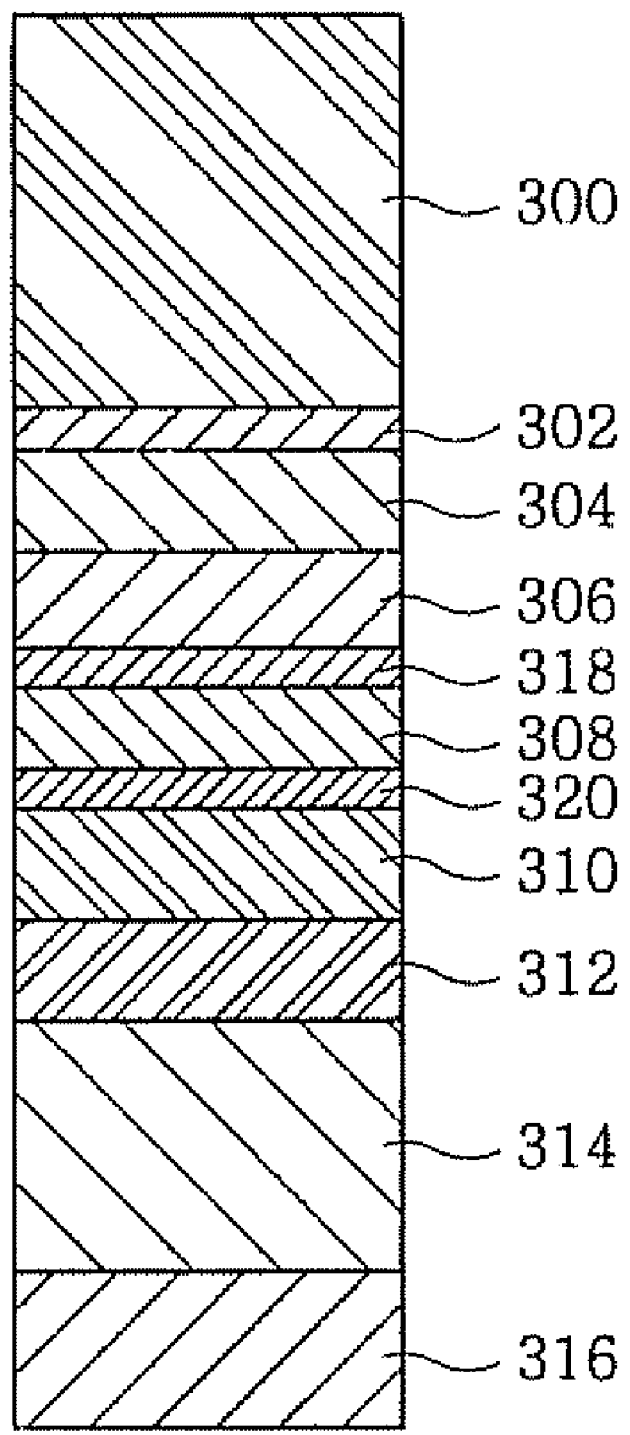
FIG. 3 illustrates the structure of a super-resolution optical recording medium in accordance with an embodiment of the present invention.

FIG. 3 shows a cross-sectional view of an optical recording medium having a super-resolution near field structure, in accordance with a preferred embodiment of the present invention.

Referring to FIG. 3, a super-resolution optical recording medium in accordance with a preferred embodiment of the present invention has a laminated structure consisting of a substrate protective layer 302, a reflective layer 304, a first dielectric layer 306, a super-resolution layer 308, a second dielectric layer 310, a recording layer 312, and a third dielectric layer 314, sequentially formed on a polycarbonate substrate 300. In addition, the super-resolution optical recording medium further includes an upper diffusion barrier layer 318 between the first dielectric layer 306 and the recording layer 308, a lower diffusion barrier layer 320 between the second dielectric layer 310 and the recording layer 308, and a UV protective layer 316 on the third dielectric layer 314.

The substrate protective layer 302 is prepared by using ZnS—SiO$_2$ with a layer thickness of 10 nm, and the reflective layer 304 is prepared by utilizing a AgPdCu alloy with a layer thickness of 40 nm. All of the first through third dielectric layers 306, 310, and 314 are made of ZnS—SiO$_2$, and have a thickness of 15 nm, 35 nm, and 110 nm, respectively. The super-resolution layer, 308 is made of an alloy having nitrogen added to Ge$_5$Sb$_{75}$Te$_{20}$. To be more specific, the super-resolution layer 308 is formed by sputtering with a mixed gas of argon and nitrogen. Ratios of the nitrogen gas flow rate to the mixed gas flow rate were varied, such as, 2% (Sample No. 1), 4% (Sample No. 2), 6% (Sample No. 3), and 8% (Sample No. 4).

Each of the upper and the lower diffusion barrier layers 318 and 320 was made of GeN with a thickness of 3 nm, The recording layer 312 was made of BaTiO$_3$ with a thickness of 6 nm, and the UV protective layer 316 was formed to have a thickness of 0.1 mm.

A comparison sample (Sample No. 5) as a super-resolution optical recording medium was prepared by adopting the same structure as that of Sample No. 3, without adding nitrogen to the super-resolution layer 308.

Figure 4:
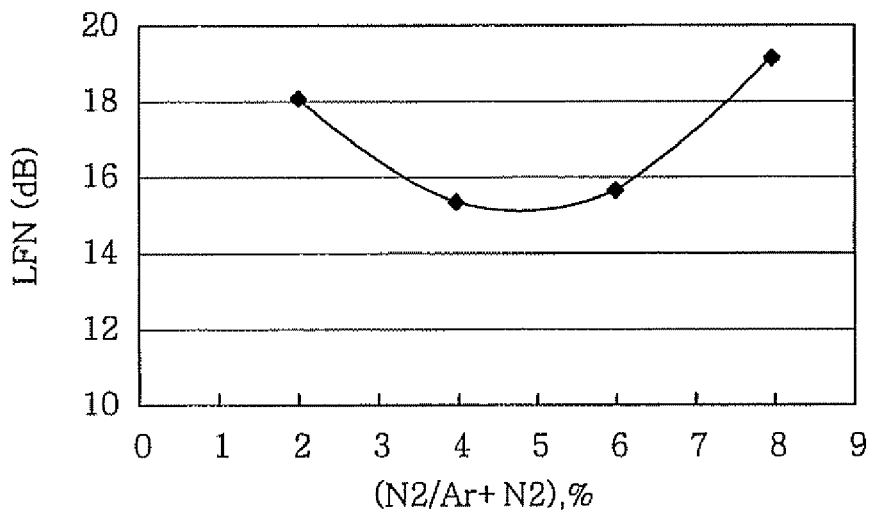
FIG. 4 is a graph showing low frequency noise characteristics corresponding to flow rate of nitrogen gas used for sputtering.

The table below provides results of recording/reproduction power, carrier-to-noise ratio (CNR), and low frequency noise (LFN) for each of four super-resolution optical recording medium samples (Sample Nos. 1 through 4) prepared under the above-described conditions. FIG. 4 is a graph showing LFN versus the ratio of N$_2$ (g) flow rate to (Ar+N$_2$) flow rate.

TABLE 1

| Sample | Ratio of N$_2$(g) flow (%) | Recording/Reproduction power (m/W) | CNR (dB) | LFN (dB) |
|---|---|---|---|---|
| 1 | 2(N$_2$/Ar = 2/98) | 6/2.1 | 43.8 | 18.1 |
| 2 | 4(N$_2$/Ar = 4/96) | 5/2 | 46.9 | 15.4 |
| 3 | 6(N$_2$/Ar = 6/94) | 5/1.9 | 45.5 | 15.7 |
| 4 | 8(N$_2$/Ar = 8/92) | 5.5/2.2 | 44.7 | 19.3 |

As can be seen from Table 1 and FIG. 4, LFN was as high as 19.3 dB when the ratio of nitrogen gas flow rate was 8%, but this is lower than that of 20 dB or greater generated in the conventional super-resolution optical recording medium. LFNs for Sample Nos. 2 and 3 having 4 to 6% of nitrogen gas flow rate were 15.4 to 15.7 dB, showing a substantial improvement compared with that of the conventional super-resolution optical recording medium. Under the same conditions, recording/reproduction power values were also relatively lower than those under different conditions. Further, those relatively high CNRs ensure superior properties for the super-resolution optical recording mediums.

Figure 5:
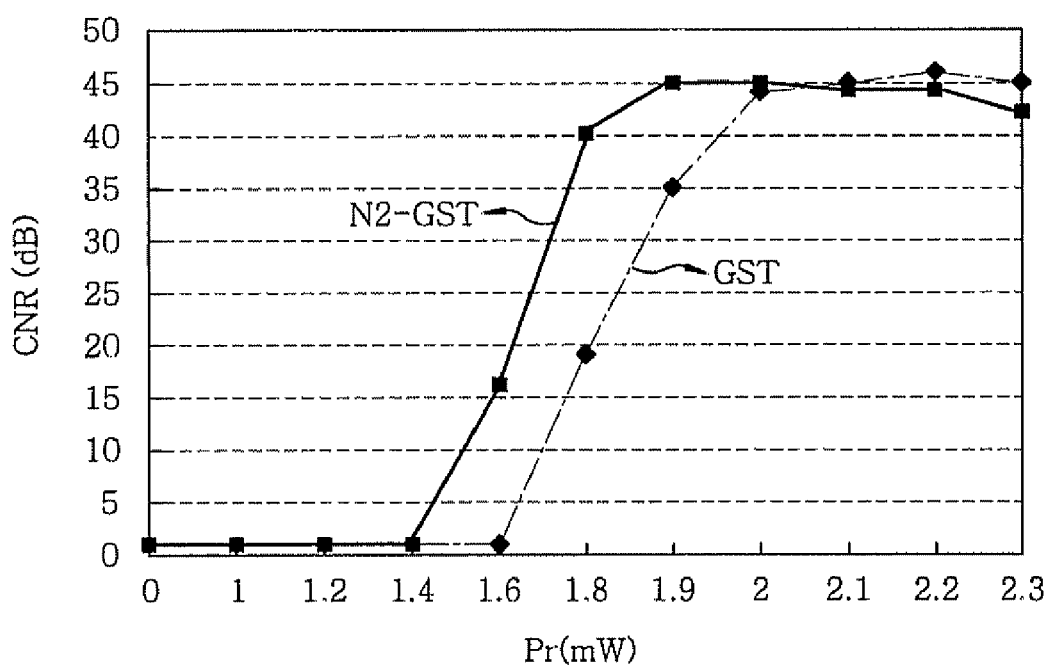
FIG. 5 is a graph showing a decrease in a threshold of reproduction power when adding nitrogen to Ge—Sb—Te used for a super-resolution layer.

FIG. 5 shows two graphs of CNR versus reproduction power between Sample No. 3 and Sample No. 5. As illustrated in FIG. 5, with the addition of nitrogen, the laser light power should be 1.4 mW or greater to enable a signal reproduction, but without the addition of nitrogen, the laser light power should be 1.6 mW or greater to perform a signal reproduction. From the foregoing, it can be seen that the threshold power of signal reproduction from the super-resolution layer with nitrogen is relatively lower than that of the super-resolution layer without nitrogen. This implies that the signal reproduction is achieved at a lower laser power by adding nitrogen to the super-resolution layer, and thus the addition of nitrogen to the super-resolution optical recording medium is more advantageous in terms of endurance against the repetitive reproduction operations.

Figure 6:
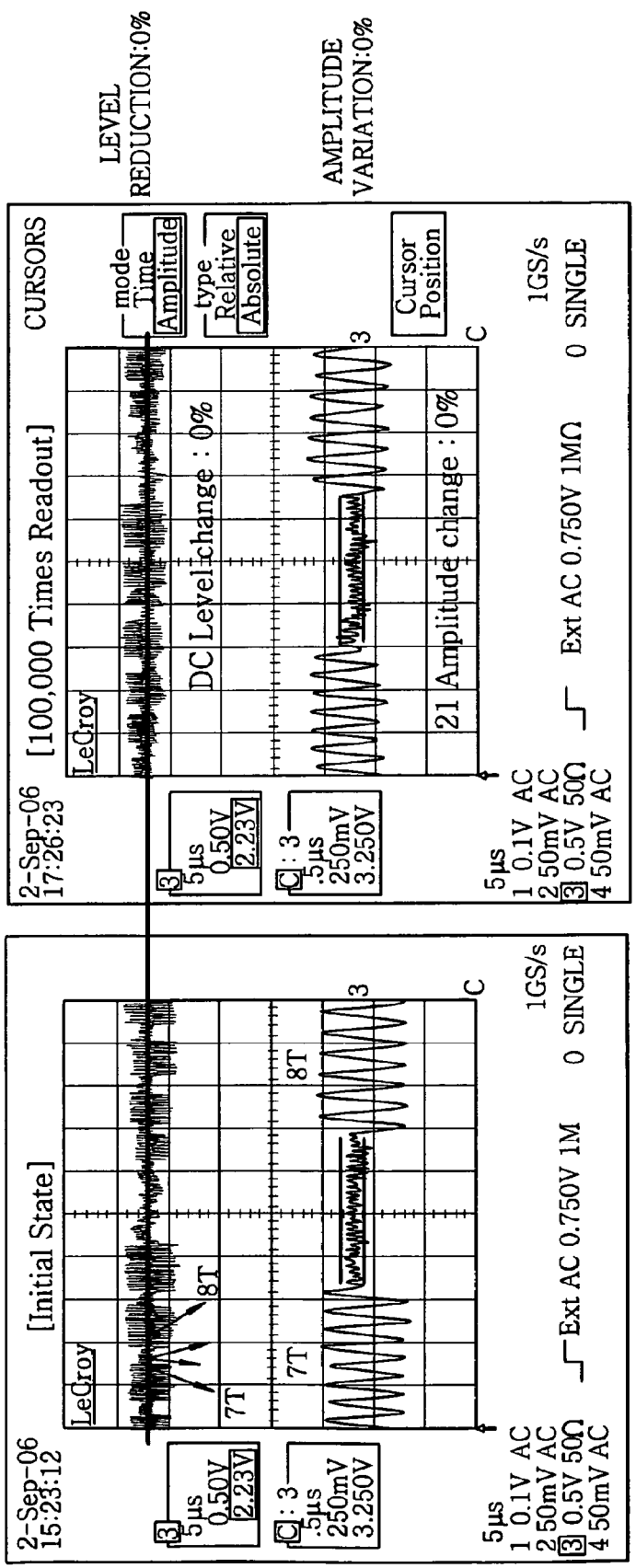
FIG. 6 shows, respectively, RF signal at the initial reproduction and RF signal after 100,000 times reproduction from the super-resolution optical medium, in accordance with the present invention.

FIG. 6 shows, respectively, RF signal at the initial reproduction and RF signal after 100,000 times reproduction from Sample No. 3.

Lower measurement graphs of FIG. 6 are enlarged views of part of upper measurement graphs of FIG. 6, in which x-axis represents time and y-axis represents voltage or a reproduced signal. Referring to FIG. 6, unlike the conventional super-resolution optical recording medium, Sample No. 3 shows no change in the average voltage level and 2T amplitude between the RF signal at the initial reproduction and the RF signal after the 100,000 times reproduction. It can be seen from the above that the super-resolution optical recording medium of the present invention can drastically improve endurance against the increased number of reproduction operations compared with that of the conventional super-resolution optical recording medium.

As discussed above, the super-resolution recording medium in accordance with the present invention uses, for a recording layer, a material that does not form bubble recording marks and its decomposition temperature is higher than the information reproduction temperature. In this manner, degradations in reproduction properties due to the diffusion of gas forming the bubble recording marks by an increased number of reproduction operations can be resolved fundamentally. Further, a new element added to the super-resolution layer improves the endurance against the repetitive reproduction of the super-resolution layer, and the reduction in thermal conductivity yields the reduction in laser power for super-resolution reproduction. Moreover, the present invention can effectively block interlayer interdiffusion observed in the conventional super-resolution optical recording medium, and thus, the degradation of the medium due to the interdiffusion can also be prevented. Therefore, the super-resolution optical recording medium of the present invention has an excellent endurance against the repetitive reproduction, and also shows a stable information reproduction operation property despite the increased number of reproduction operations. In addition, the occurrence of low frequency noises during the high-temperature reproduction is suppressed to provide improved signal characteristics of the recording medium.

While the invention has been shown and described with respect to the preferred embodiments, it will be understood by those skilled in the art that various changes and modification may be made without departing from the scope of the invention as defined in the following claims.

What is claimed is:

1. A super-resolution optical recording medium, comprising:
   a reflective layer formed on a substrate,
   a recording layer for recording information thereon,
   a super-resolution layer made of a chalcogenide semiconductor material, and
   a first and a second dielectric layers laminated on upper and lower surfaces of the super-resolution layer,
   wherein the recording layer is made of a material that has a decomposition temperature higher than an information reproduction temperature and does not form bubble recording marks during recording, and the super-resolution layer contains one or more elements selected from the group consisting of nitrogen, oxygen, carbon, and boron.

2. The super-resolution optical recording medium of claim 1, wherein the recording layer is made of BaTiO$_3$.

3. The super-resolution optical recording medium of claim 2, wherein the BaTiO$_3$ is formed with a layer thickness of 2 nm to 20 nm.

4. The super-resolution optical recording medium of claim 1, wherein the super-resolution layer is made of a chalcogenide semiconductor material.

5. The super-resolution optical recording medium of claim 4, wherein the chalcogenide semiconductor material contains one of Pb—Te, Ge—Sb—Te, and Ag—In—Sb—Te compounds.

6. The super-resolution optical recording medium of claim 4, wherein the super-resolution layer has a thickness ranging from 1 nm to $\lambda/2\pi k$ nm.

7. The super-resolution optical recording medium of claim 4, wherein the super-resolution layer is formed by sputtering under a mixed gas of an inert gas, and a gas containing one or more elements selected from the group consisting of nitrogen, oxygen, carbon, and boron.

8. The super-resolution optical recording medium of claim 1, wherein a diffusion barrier layer is formed between the super-resolution layer and the first and the second dielectric layers, respectively.

9. The super-resolution optical recording medium of claim 8, wherein the diffusion barrier layer is made of a material containing one of GeN, SiN, and $SiO_2$.

10. The super-resolution optical recording medium of claim 1, wherein a substrate: protective layer is formed between the substrate and the reflective layer.

* * * * *